United States Patent Office 3,483,868
Patented Dec. 16, 1969

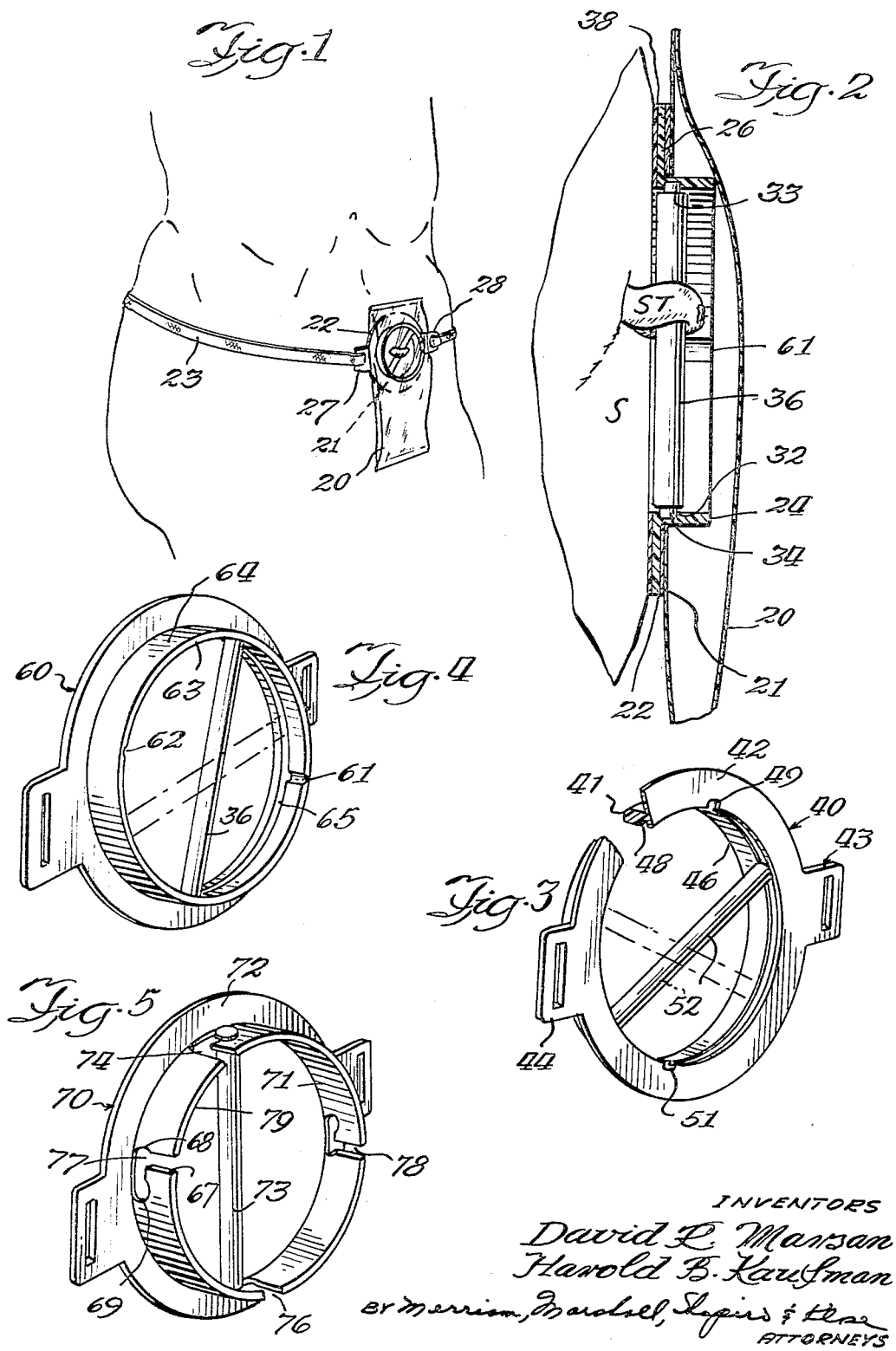

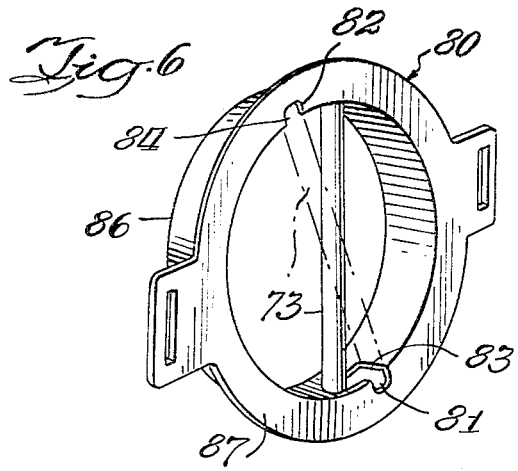
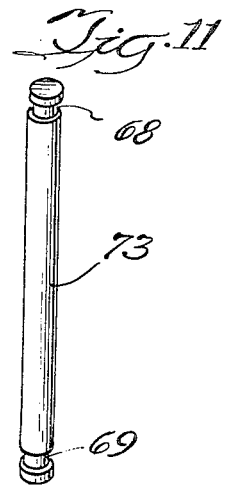
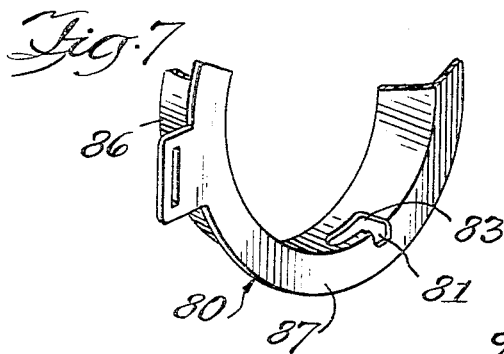
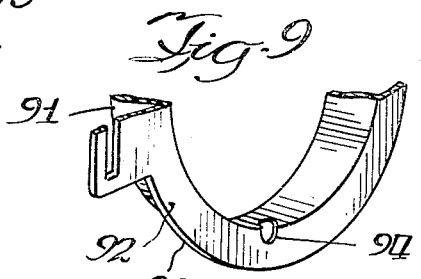
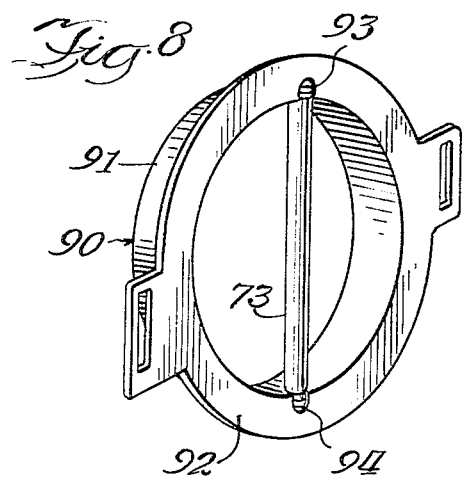
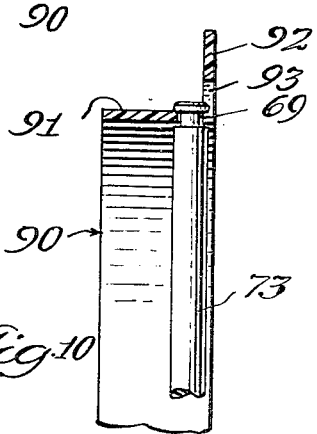

3,483,868
COLOSTOMY APPLIANCE
David R. Marsan, Worth, and Harold B. Kaufman, Midlothian, Ill., assignors to The Marsan Manufacturing Co., Inc., Chicago, Ill., a corporation of Illinois
Filed Nov. 4, 1966, Ser. No. 592,206
Int. Cl. A61f 5/44
U.S. Cl. 128—283                                    4 Claims

ABSTRACT OF THE DISCLOSURE

A gasket for use with an expendable colostomy pouch and retainer wherein a restraining rod is disposed in a loop of intestine and cooperates with said gasket to provide a leak-proof device.

---

This invention relates to an appliance for use with a colostomy pouch and retainer and particularly to a gasket for use on patients with temporary colostomies. Although reference will hereinafter be made to colostomies only, the subject invention is readily adaptable to ileostomies and other similar drainage techniques.

A common surgical procedure involves making an incision in the human abdomen and exposing a section of the colon or ileum in order to provide for the elimination of waste material at the point of the incision. Where the colostomy is intended for only temporary duration, the technique includes bringing a loop of the intestine through the surface of the skin and maintaining the loop in that position by inserting a plastic restraining rod or the like through the eye of the loop outside the body. An opening is then made in the loop to allow elimination. This portion of intestine with its opening is referred to herein as the stoma. In the past, it has been the practice to dress the stoma with bandage or the like and hereby collect the waste material through absorption. This method is not only esthetically unpleasing but the continued contact of waste material with the wound causes skin excoriation.

With the present invention, the ends of the plastic restraining rod are adapted to be received in a gasket which gasket is in turn adapted for cooperation with an expendable colostomy pouch such as that shown in U.S. Patent No. 2,741,247. Since the size of the loop is fixed by the size of the incision, the rod is held at a substantially fixed position. By inserting the ends of the rod in the means provided on the gasket, the gasket is urged against the abdomen of the wearer.

It is an important element of the present invention that the gasket be provided with means to receive the ends of the rod regardless of the position of the rod.

The present invention provides a sterile package which reduces or eliminates bandages and dressings and aids in the presention of irritation and infection.

It is also an element of the present invention that the surface of the gasket coming in contact with the skin may be provided with a pressure sensitive adhesive for additional sealing effect. Further precaution against leakage and comfort to the wearer may be provided by a layer of foam rubber, or a karaya gum washer disposed between the gasket and the skin.

If the restraining rod is to be later removed while retaining the stoma, the gasket can continue to be used with the expendable colostomy pouches in the conventional manner.

Further objects and advantages of the present invention will be apparent from the following description, reference being had to the drawings wherein:

FIGURE 1 shows the complete apparatus as secured to the wearer.

FIGURE 2 is a fragmentary view of the subject invention as secured to the wearer.

FIGURE 3 is a fragmentary isometric view of the subject invention.

FIGURE 4 is an isometric view of an alternative embodiment of the subject invention.

FIGURE 5 is an isometric view of an alternative embodiment of the subject invention.

FIGURE 6 is an isometric view of an alternative embodiment of the subject invention.

FIGURE 7 is a fragmentary isometric view of the gasket shown in FIGURE 6.

FIGURE 8 is an isometric view of another embodiment of the present invention.

FIGURE 9 is a fragmentary isometric view of the gasket shown in FIGURE 8.

FIGURE 10 is a fragmentary view of the embodiment shown in FIGURE 8.

FIGURE 11 is an isometric view of an element of the present invention.

Referring now to the drawings, in FIGURES 1 and 2 is shown an expendable colostomy pouch 20 and retainer 21 secured over the stoma ST of the wearer by means of gasket 22 and belt 23. Gasket 22 comprises a tubular section 24 having a peripheral flange 26. Although reference is hereinafter made to a tubular section, it is understood that the central opening of the gaskets here described may be of other than circular shape and consequently said "tubular section" may have a rectangular, square, or irregular cross-sectional configuration. Peripheral flange 26 has. diametrically opposing apertured flanges 27 and 28 depending therefrom. Tubular section 24 includes detents 32 on the inside surface thereof for the reception of the ends 33, 34 of restraining rod 36, said restraining rod 36 being disposed in the loop of the intestine. Washer 38 is shown located between peripheral flange 26 and the skin S of the wearer.

Referring now to FIGURE 3, gasket 40 includes a tubular section 41 having a peripheral flange 42. Peripheral flange 42 has diametrically opposing apertured flanges 43 and 44 depending therefrom. Formed in the inside surface 46 of said tubular section 41 is continuous channel 48. Diametrically opposing lateral channels 49 and 51 extend from the peripheral flange 42 along the inside surface 46 of tubular section 41 to continuous channel 48. Restraining rod 52, identical in shape to restraining rod 36 shown in FIGURE 2, has end portions or protuberances (not shown in FIGURE 3) of a diameter substantially less than the diameter of the central or major portion of the rod and small enough to be received in the lateral channels 49, 51 and continuous channel 48.

Ths gasket 60 in FIGURE 4 is similar in all structured particulars to gasket 40 of FIGURE 4 except that lateral channels 61 and 62 extend from the distal end 63 of tubular section 64 to the continuous channel 65.

Referring now to FIGURES 5 and 11, gasket 70 includes a tubular section 71 having a peripheral flange 72.

Restraining rod 73 has a pair of spaced peripheral recesses 68 and 69 and is received in diametrically opposing L-shaped slots 74 and 76. Additional alternative diametrically opposing L-shaped slots 77 and 78 are shown for receiving and retaining rod 73. The receiving end 67 of L-shaped slots 74, 76, 77, and 78 are located at the distal end of tubular section 71.

In the embodiment shown in FIGURE 5, L-shaped slots 74, 76, 77 and 78 are spaced at 90° intervals. Additional L-shaped slots may be provided as long as for each L-shaped slot there exists a diametrically opposing L-shaped slot and there is sufficient area on the surface of tubular section 71.

The length of the central portion of rod 73 is substantially equal to the inside diameter of tubular section 71. The width of recesses 68 and 69 is substantially equal to the thickness of the wall 79 of tubular section 71. The diameter of rod 73 at recesses 68 and 69 is substantially equal to the width of the slot except at the elbow 68 and terminal end 69 of said slot where the slot is wider to allow for positioning and retaining restraining rod 73.

Gasket 80 shown in FIGURES 6 and 7 has the receiving end 81 and 82 of L-shaped slots 83 and 84, respectively, located at the junction of tubular section 86 and peripheral flange 87.

Referring now to FIGURES 8, 9 and 10, gasket 90 has a tubular section 91 and peripheral flange 92. Diametrically opposing openings 93 and 94 in tubular section 91 and peripheral flange 92 are shown for receiving and retaining restraining rod 73. Said opening consists of a partial substantially circular segment through the peripheral flange 92 extending to the junction between tubular section 91 and peripheral flange 92 communicating with a partial substantially circular segment through the wall of tubular section 92 extending to said junction.

It will be noted that the gaskets shown in FIGURES 3, 4, 5, 6, and 8 are either adapted to receive restraining rod 73 through the distal end of the tubular section, e.g., FIGURES 4 and 5, or to receive it through the peripheral flange, e.g., FIGURES 3, 6, and 8. This structural difference in the gaskets shown is designed to facilitate the retention of restraining rod 73 regardless of the surgical procedure employed to secure the stoma outside the body.

In normal practice, once the loop of the intestine is displaced from its natural position, a flexible tubing (not shown) is inserted through the loop. A restraining rod is inserted in one end of the flexible tubing. By pulling on both ends of the flexible tubing simultaneously, the intestine is extended outside the body to the position desired. The incision in the abdominal wall is then closed to that point through which the intestine extends. In the method preferred, when using the invention herein disclosed, a gasket of the type shown in FIGURES 4 and 5, i.e., the openings for receiving the restraining rod are located at the distal end of the tubular section, the gasket, with the peripheral flange first, is slipped over the ends of the flexible tubing. The peripheral flange of the gasket is placed against the skin and the flexible tubing is slowly pulled through the loop until the restraining rod is disposed in the loop. The flexible tubing is removed from the restraining rod and the ends of the restraining rod are positioned in the openings at the distal end of the tubular section. The rod is then positioned in the means provided in the respective gaskets for retention.

In that surgical procedure where the tube is pulled through the loop of the intestine before the gasket is slipped over the intestine, it is necessary that the ends of the restraining rod be received in the gasket through openings or detents located in the peripheral flange rather than the distal end of the tubular section. Gaskets of the type shown in FIGURES 3, 6 and 8 are provided for that purpose.

In a preferred embodiment of the present invention, the gasket is of unitary construction and molded of polyethylene. The outside diameter of the peripheral flange is approximately 4¼" and the inside diameter is approximately 2¹³⁄₁₆". The diametrically opposing apertured flanges are approximately 1¼" x ½". The apertures are of rectangular shape ⅛" v ⅝" and capable of receiving the ends of a belt or the like. The peripheral flange is ¹⁄₁₆" thick. The tubular section is approximately ⁵⁄₁₉" long and ⅛" thick. The inside diameter of the tubular section is the same as the inside diameter of the peripheral flange, i.e., 2¹³⁄₁₆".

A continuous channel approximately ⅛" wide x ¹⁄₁₆" deep is formed on the inside surface of the tubular section. Two diametrically opposing lateral channels ¼" wide x ³⁄₃₂" deep extend from the distal end of the tubular section to the continuous channel.

The restraining rod is of clear plastic approximately 2¹⁵⁄₁₆" long and having a central portion ¼" diameter. The last ³⁄₃₂" on either end of the rod is approximately ⅛" diameter.

Once the surgical procedures have been completed and while the flexible tubing remains in the loop of the intestine, the restraining rod is inserted in one end of the flexible tube. The ends of the flexible tubing are then inserted through the central opening of the above described gasket with the peripheral flange first. The peripheral flange is placed against the skin and the tubing is pulled through the loop until the rod is disposed in such a position in the loop so that approximately equal amounts of the rod are visible on either end of the intestine. The rod is removed from the tubing and the lateral channels of the gasket are aligned with the ends of the rod. The ends of the rod are received in the lateral channels and the entire gasket is manipulated until the ends of the rod are located in the continuous channel. The gasket is then turned so that the apertured flanges are pointed toward the sides of the wearer to facilitate the attaching of a belt.

An expendable colostomy pouch and retainer is then slipped over the tubular section and adhesively secured to the peripheral flange. In the preferred embodiment, the retainer is of the same configuration as the peripheral flange and has an opening or diameter equal to the outside diameter of the tubular section.

The gasket of the subject invention may, of course, be used in combination with other expendable pouches and retainers. Another combination includes one of the gaskets herein shown, a top opening expendable pouch and a retainer ring having an inside diameter slightly larger than the tubular section of the gasket. A length of the pouch adjacent to its open end is fed through and folded back over the retainer ring. The retainer ring is then received over the tubular section to effect a substantially leak tight seal.

The gasket may be made from a variety of materials, it being important, however, that the gasket be sufficiently flexible to conform to the portion of the body with which it comes in contact and that it be resistant to the eliminated material. A washer of soft pliable material such as foam rubber or karaya gum, formed to the same general shape as the peripheral flange and placed between the flange and the skin may be employed as a further precaution against leakage and for the comfort of the wearer.

A foregoing description has been made for purposes of illustration only, it being understood that others will make additions or changes within the scope and spirit of the subject invention.

What is claimed is:

1. A gasket of unitary construction for use with an expendable colostomy pouch, retainer and a colostomy including a restraining rod of finite length disposed in a loop of intestine, said gasket comprising:
   a tubular section having a peripheral flange, said peripheral flange having a planar front surface and a back surface, and having diametrically opposing apertured flanges outwardly extending therefrom;
   means on said front planar surface for adhesively securing said gasket to the body of said wearer;
   means on said back surface for adhesively securing said expendable pouch and retainer to the gasket;
   a continuous annular channel provided in the inside surface of said tubular section; and,
   at least one pair of diametrically opposing lateral channels communicating with said annular channel and adapted to receive the ends of said restraining rod.

2. A colostomy appliance comprising:
   an expendable colostomy pouch;
   a retainer;
   a restraining rod to be disposed in a loop of intestine having a major portion of circular cross-sections and finite length and a diameter having a protuberance outwardly extending from each end thereof, said protuberances of a lesser diameter of said major portion and adapted to be received in said lateral channels and be restrained in said continuous annular channels;

a tubular section having a peripheral flange;

a continuous annular channel provided in the inside surface of said tubular section; and, at least one pair of diametrically opposing lateral channels communicating with said continuous annular channel and attached to receive the ends of said restraining rod.

3. A gasket of unitary construction for use with an expendable colostomy pouch, retainer and a colostomy including a restraining rod of finite length disposed in a loop of intestine, said gasket comprising:

a tubular section having a peripheral flange, said peripheral flange having a planar front surface, a back surface, diametrically opposing apertured flanges outwardly extending therefrom, means on said planar front surface for adhesively securing said gasket to the body of said wearer and means on said back surface for adhesively securing said expendable pouch and retainer to the gasket;

at least one pair of diametrically opposing L-shaped slots formed in said tubular section; and said slots being of finite width and having a receiving end.

4. A colostomy appliance comprising;

an expendable colostomy pouch;

a retainer;

a tubular section of finite inside diameter and finite wall thickness having a peripheral flange;

at least one pair of diametrically opposing L-shaped slots formed in said tubular section, said slots being of finite width and having a receiving end; and a restraining rod having a pair of longitudinally spaced peripheral recesses, the distance between said recesses substantially equal to said inside diameter of said tubular section, said recesses having a width substantially equal to said wall thickness and a diameter substantially equal to said width of said L-shaped slots.

References Cited

UNITED STATES PATENTS

| | | | |
|---|---|---|---|
| 2,684,675 | 7/1954 | Perry | 128—283 |
| 2,796,063 | 6/1957 | Smelser | 128—283 |
| 3,292,625 | 12/1966 | Marsan | 128—283 |

FOREIGN PATENTS

| | | |
|---|---|---|
| 27,254 | 11/1909 | Great Britain. |
| 435,993 | 1/1912 | France. |

CHARLES F. ROSENBAUM, Primary Examiner